United States Patent
Arpin (10) Patent No.: US 7,315,615 B2
(45) Date of Patent: Jan. 1, 2008

(54) AUTOMATIC TELEPHONE LINE SWITCH

(75) Inventor: Claude Arpin, St. Hippolyte (CA)

(73) Assignee: Sittelle Technologies, Inc., Quebec (CA)

(*) Notice: Subject to any disclaimer, the term of this patent is extended or adjusted under 35 U.S.C. 154(b) by 394 days.

(21) Appl. No.: 10/350,383

(22) Filed: Jan. 23, 2003

(65) Prior Publication Data

US 2005/0117732 A1    Jun. 2, 2005

Related U.S. Application Data

(60) Provisional application No. 60/350,981, filed on Jan. 25, 2002.

(51) Int. Cl.
*H04M 7/00* (2006.01)
*H04M 3/42* (2006.01)

(52) U.S. Cl. .................. 379/221.01; 379/201.01

(58) Field of Classification Search ........... 379/221.01, 379/221.02, 201.01, 156, 93.09
See application file for complete search history.

(56) References Cited

U.S. PATENT DOCUMENTS

| | | | |
|---|---|---|---|
| 3,882,421 A | | 5/1975 | Stein |
| 5,341,415 A | * | 8/1994 | Baran ................ 379/140 |
| 5,533,111 A | * | 7/1996 | Schlanger ............ 379/229 |
| 5,550,915 A | * | 8/1996 | Partridge, III ......... 379/355 |
| 5,570,422 A | | 10/1996 | Napiorkowski |
| 5,790,651 A | | 8/1998 | Suzuki |
| 5,920,615 A | | 7/1999 | Nolde |
| 5,937,055 A | * | 8/1999 | Kaplan ............... 379/221.14 |
| 5,960,075 A | | 9/1999 | Sutherland |
| 5,991,270 A | | 11/1999 | Zwan |
| 6,118,766 A | | 9/2000 | Akers |
| 6,160,880 A | * | 12/2000 | Allen ................ 379/221.13 |
| 6,163,594 A | | 12/2000 | Kennedey |
| 6,185,191 B1 | | 2/2001 | Dipperstein |
| 6,212,168 B1 | | 4/2001 | So |
| 6,212,274 B1 | | 4/2001 | Ninh |
| 6,259,676 B1 | | 7/2001 | Kellock |
| 6,266,395 B1 | | 7/2001 | Liu |
| 6,282,277 B1 | * | 8/2001 | DeBalko ............. 379/221.02 |
| 6,415,022 B1 | | 7/2002 | Meeske |
| 6,539,085 B2 | * | 3/2003 | Gerthe ............... 379/168 |
| 2001/0040956 A1 | | 11/2001 | King |
| 2002/0001288 A1 | | 1/2002 | Fukunaga |
| 2002/0003873 A1 | | 1/2002 | Rabenko et al. |
| 2002/0015489 A1 | | 2/2002 | Ben-David |

\* cited by examiner

*Primary Examiner*—William J. Deane, Jr.
(74) *Attorney, Agent, or Firm*—Baker & Hostetler LLP (57) ABSTRACT

An apparatus (40) and method for switching a customer-premises telephone line (36) between a plurality of local telephone networks (35). The local telephone networks may have different electrical and operational characteristics. Using less than 100 micro-amperes of current from the telephone networks, the apparatus (40) requires no external power and performs its tasks without interfering with the normal operation of the telephone networks including test equipment, terminal equipment, data transmission on the telephone line and test equipment.

The method involves monitoring electrical signals on both local telephone networks (35) and using this information to assign a weight to each network. The customer-premises telephone line (36) is switched to the telephone network having the highest weight. The advantages are the elimination of a service call by a technician to manually switch the customer premises telephone line (36), equal access by both service providers to the switch and a seamless interface to the telephone networks.

7 Claims, 12 Drawing Sheets

FIG. 1     PRIOR ART

PRIOR ART

AUTOMATIC TELEPHONE LINE SWITCH

CROSS-REFERENCE TO RELATED APPLICATIONS

The present application clams priority from U.S. Provisional application Ser. No. 60/350,981, filed Jan. 25, 2002, which is incorporated herein by reference.

FIELD OF THE INVENTION

This Automatic telephone Line Switch (ATLS) relates to a telecommunication switch designed to switch a customer-premises two-wire telephone line between one of a plurality of local telephone networks owned by independent telephone service providers. The switching is performed at the subscriber's end of the network without the intervention of an on-site service technician.

BACKGROUND OF INVENTION

Figure 1:
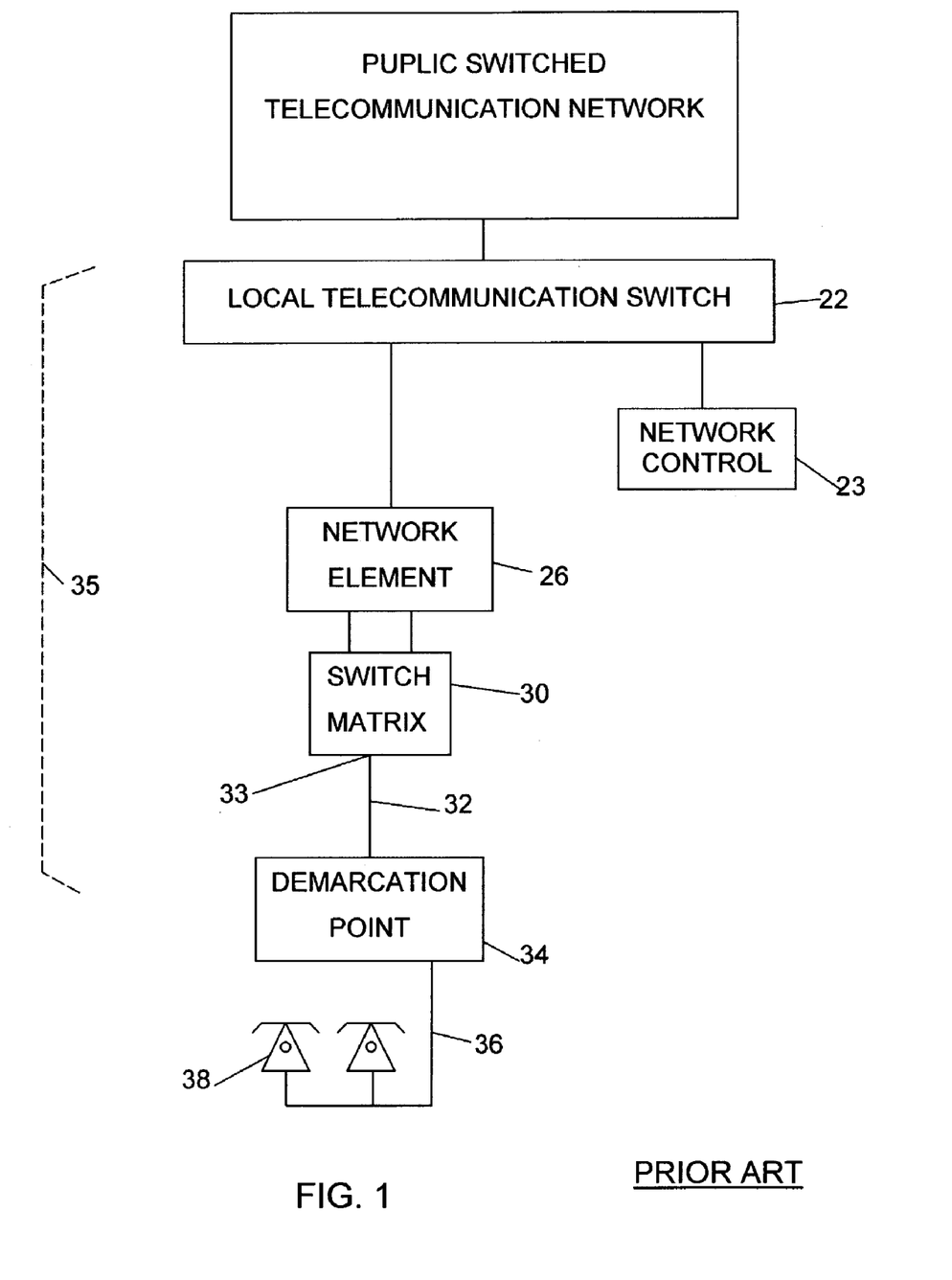
FIG. 1 Shows a prior art single service provider local telephone network.

Traditionally most local telephone networks belonged to the same telephone company. This company was broken up into several Regional Bell Operating Companies (RBOC). These telephone service providers are now called Local Exchange Carriers (LEC). Every subscriber that has local (i.e.: not long distance, not cellular) telephone service is connected to a local telephone line 32 as shown in FIG. 1. The point of origin of the local telephone line is the LEC equipment 33. At the point of origin 33, the local telephone line 32 can be switched between different types of equipment or network interfaces using a switch matrix 30 of the type described by Kellock U.S. Pat. No. 6,259,676,B1, dated Jul. 10, 2001 or using the method described by King, US Patent Application US 2001/0040956 A1 dated Nov. 15, 2001. The switch matrix 30 can be an automatic device of the type described by Suzuki et al., U.S. Pat. No. 5,790,651, dated Aug. 4, 1998, or a manual connection block as described by Napiorkowski et al., U.S. Pat. No. 5,570,422, Dated Oct. 29, 1996. All the local telephone equipment from the local telephone switch 22 up to the demarcation point 34 shown in FIG. 1 belongs to a single service provider having one centralized network maintenance and control system 23 also called an Operation System (OS). The term local telephone network is used throughout this document to designate the equipment, the facilities and the operating system. The demarcation point 34 is the interface point between the customer-premises telephone line 36 and the service provider local network 35. The term Network Terminating Interface (NTE) is often a synonym of the demarcation point 34. To simplify the diagram, a telephone symbol 38 is used to represent any customer-premises telephone equipment in FIG. 1 to 4.

Figure 2:
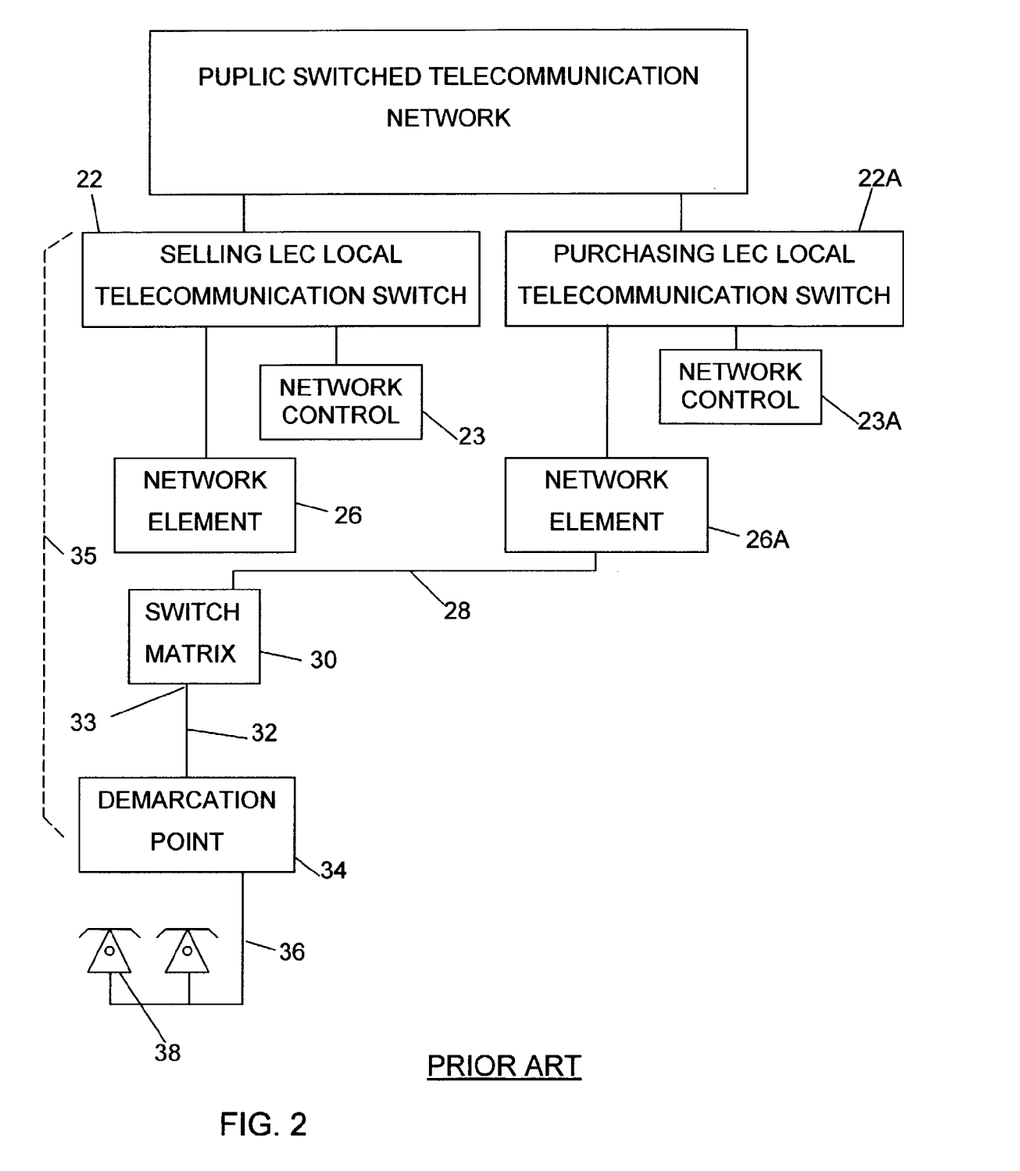
FIG. 2 Shows a prior art dual service providers sharing a single local telephone network.

In the early 1990's, LECs started competing with other LECs by purchasing facilities (i.e. telephone lines) from selling LECs. FIG. 2 shows a customer-premises telephone line 36 connected to a local telephone line 32 that belongs to a LEC but is purchased by another LEC. As can be seen from FIG. 2, switching local telephone lines 32 with attached customer-premises lines 36 at the service provider end of the network can easily be accomplished by prior art equipment and methods 28, 30 described above or by maintenance personnel.

Figure 3:
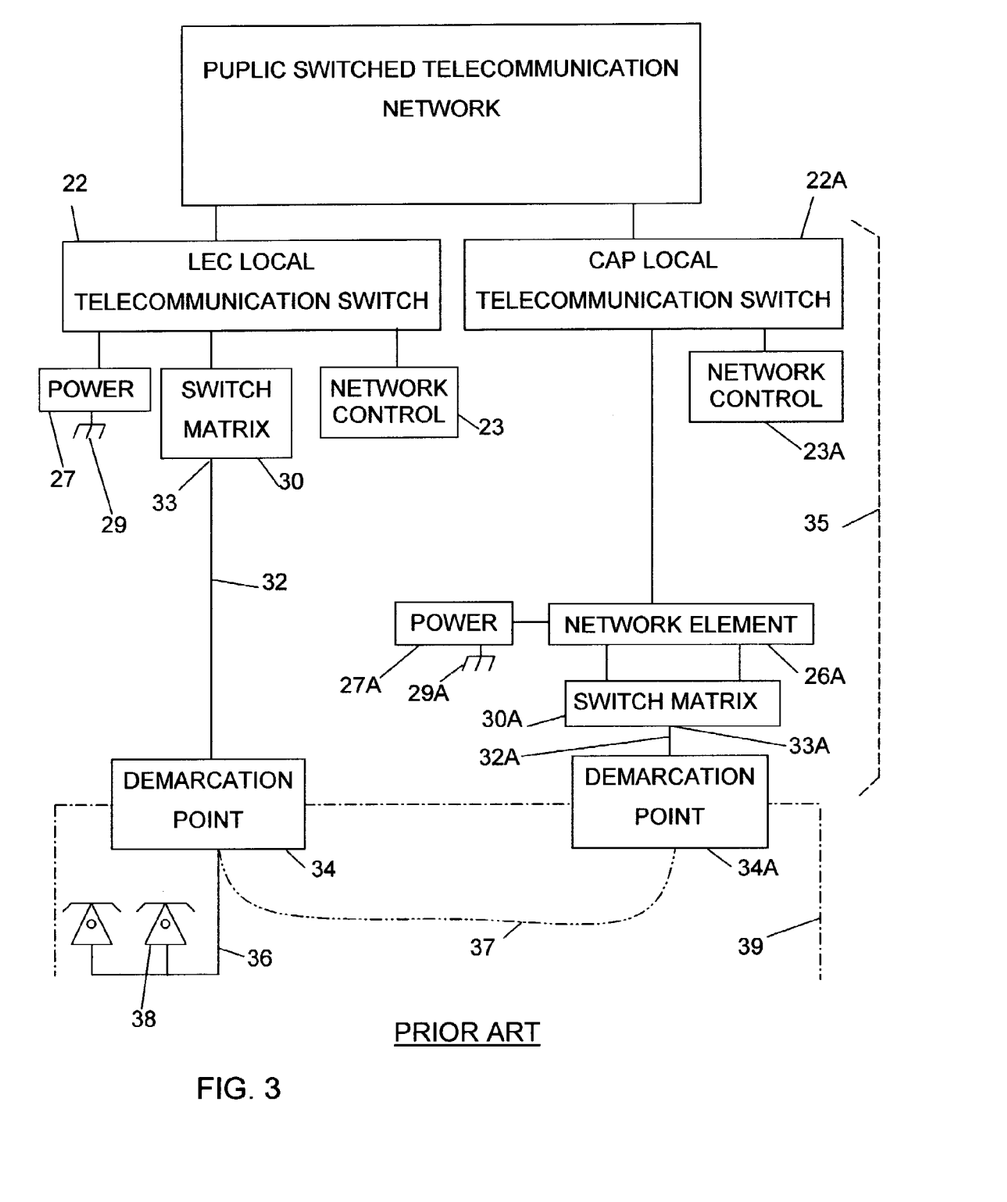
FIG. 3 Shows a prior art dual service providers with separate and independent local telephone networks.

As the telecommunications industry evolved, Competitive Access Providers (CAPs) emerged to compete with LECs to offer subscribers local telephone service. The CAPs extended their telecommunication networks from the Local telecommunication Switch 22A up to the demarcation point 34A. FIG. 3 shows a subscriber that is serviced by two telephone service providers. Each service provider has a local telephone network 22 to 34 and 22A to 34A that terminates at demarcation points 34 and 34A at the subscriber's premises 39.

This new configuration creates a problem involving an expensive service call by maintenance personnel that wipes out any benefits to consumers afforded by competition in the local telephone industry.

When a subscriber changes from one service provider to the other, the telephone line 36 has to be physically disconnected from demarcation point 34 and re-connected to demarcation point 34A. For many reasons, it is not possible to connect both telephone lines in parallel 37 at the subscriber end with prior art equipment 30 and 30A such as Kellock or by using a the method described by King. One major reasons is that the local networks of the two service providers often have different electrical characteristics, some model of Network Elements (NE) 26A used by CAPs have a 24 Volts DC battery voltage with a local ground 29A while the LEC network may have a 48 volt DC battery voltage that is grounded at the originating end of the network 29. FIG. 3 illustrated a frequent network configuration where the LEC has a very long local telephone line 32 between its local switch 30 and the demarcation point 34 while the CAP has a short local telephone line 32A because the CAP has placed the Network Element 26A close the demarcation point 34A. King recognizes that telephone systems are not designed to operate with two lines in parallel in paragraph (0037) page 3 and goes on to state that maintenance personnel is still required although at a more convenient time.

While King claims the selling LEC gives control of the connection process to the purchasing LEC, FIG. 5, block S12 of his patent shows the purchasing LEC requesting a confirmation from the selling LEC effectively giving the selling LEC the capability to block or delay the transfer of the subscriber. While LECs tent to cooperate with each other, cooperation between a CAP and a LEC is less frequent. From a business perspective, the problem is easily understood; LECs selling and buying from each other are in a win-win situation. On the other hand, a CAP completely removes the subscriber and the revenue stream, leaving the LEC with an unused facility that still requires maintenance.

A telecommunications switch as described by Nolde, U.S. Pat. No. 5,920,615, dated Jul. 6, 1999 is also not feasible to eliminate service calls because it is designed to switch a plurality of normal communication apparatus on a single local telephone line using four wires. It does not take into account the requirement of multiple and electrically different local telephone networks as described above. In addition a Nolde-type master-slave system does not solve the equal access issues.

Powering equipment to switch telephone lines at the Demarcation Points 34 and 34A is also a serious problem not envisioned by any prior equipment. A LEC will not accept a piece of equipment in its network that is powered by local power 27A (often used by CAP service providers) while it has centralized diesel and battery backup facilities 27 with different, sometimes better, capabilities. This eliminates prior art equipment such as Meeske, U.S. Pat. No. 6,415,022 B1, dated Jul. 2, 2002. The Meeske equipment also adds tremendous complexity to the network. Each CAP and LEC would have to keep track of this equipment and its configuration in multiple locations. Errors of one company in programming such equipment could result in loss of service to a competitor's subscriber.

While using local AC power is not an option, using the telephone line power to operate equipment at the demarcation points 34 and 34A poses serious problems because that power is intended to operate customer-premises equipment such as telephones, fax machines, modems and CallerID devices that rely on the power available from the local telephone line such as described by Ninh, U.S. Pat. No. 6,212,274 B1, dated Apr. 3, 2001. The problem is compounded by maintenance equipment used by the service providers such as equipment described by Liu, U.S. Pat. No. 6,266,395 B1, dated Jul. 24, 2001.

It is an objective of this invention to solve the problems described above in a way defined in the independent claims.

BRIEF SUMMARY OF THE INVENTION

The automatic telephone line switch (ATLS) is a device to automatically switch a customer-premises telephone line between a plurality of local telephone networks belonging to different service providers without the intervention of an on site technician. The plurality of telephone networks may have different electrical and operational characteristics. The switching is done at the customer end of the local telephone network. The ATLS performs its tasks while drawing less than 100 microamperes of current from the local telephone networks, thus requiring no external power. The ATLS performs its tasks without interfering with the normal operation of the telephone networks including terminal equipment, data transmission on the telephone line and test equipment. By monitoring signals on both telephone networks such as line voltage, dialtone, ringing, off-hook, CallerID, DTMF and tone, the ATLS performs an arbitration function to determine which telephone network should be connected to the customer-premises telephone line.

BRIEF DESCRIPTION OF THE DRAWINGS

These drawing represent non limiting examples of preferred embodiments of the Automatic Telephone Line Switch (ATLS), in which like reference numerals represent similar parts through the several views of the drawings.

DETAILED DESCRIPTION

ATLS Network Connection

Figure 4:
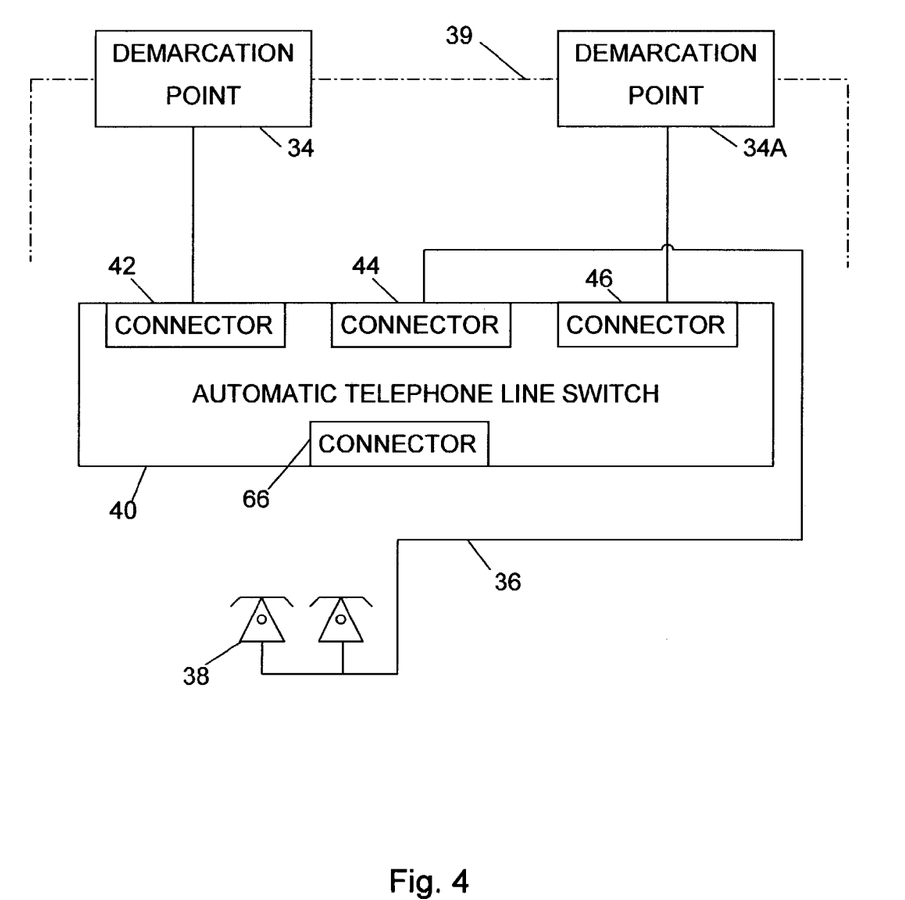
FIG. 4 is a connection diagram of the ATLS.

The connections between the ATLS 40, the local networks and the customer-premises telephone line are shows in FIG. 4. The customer-premises telephone line is connected to connector 44 while the LEC network is connected to 42 and the CAP network is connected to 46. Connector 66 is used to program the central processor 162.

Detailed Block Diagram

Figure 5:
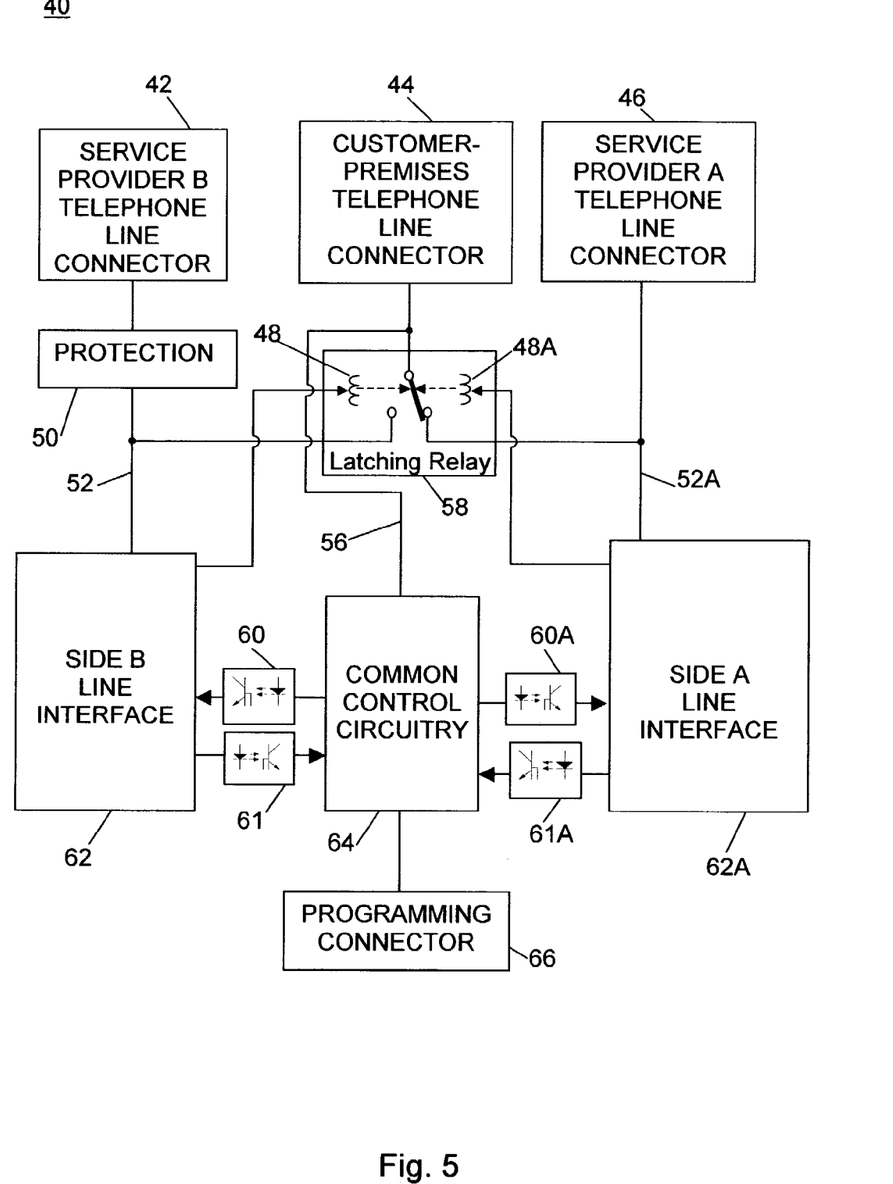
FIG. 5 is a block diagram of the preferred embodiment of the ATLS.
Figure 6:
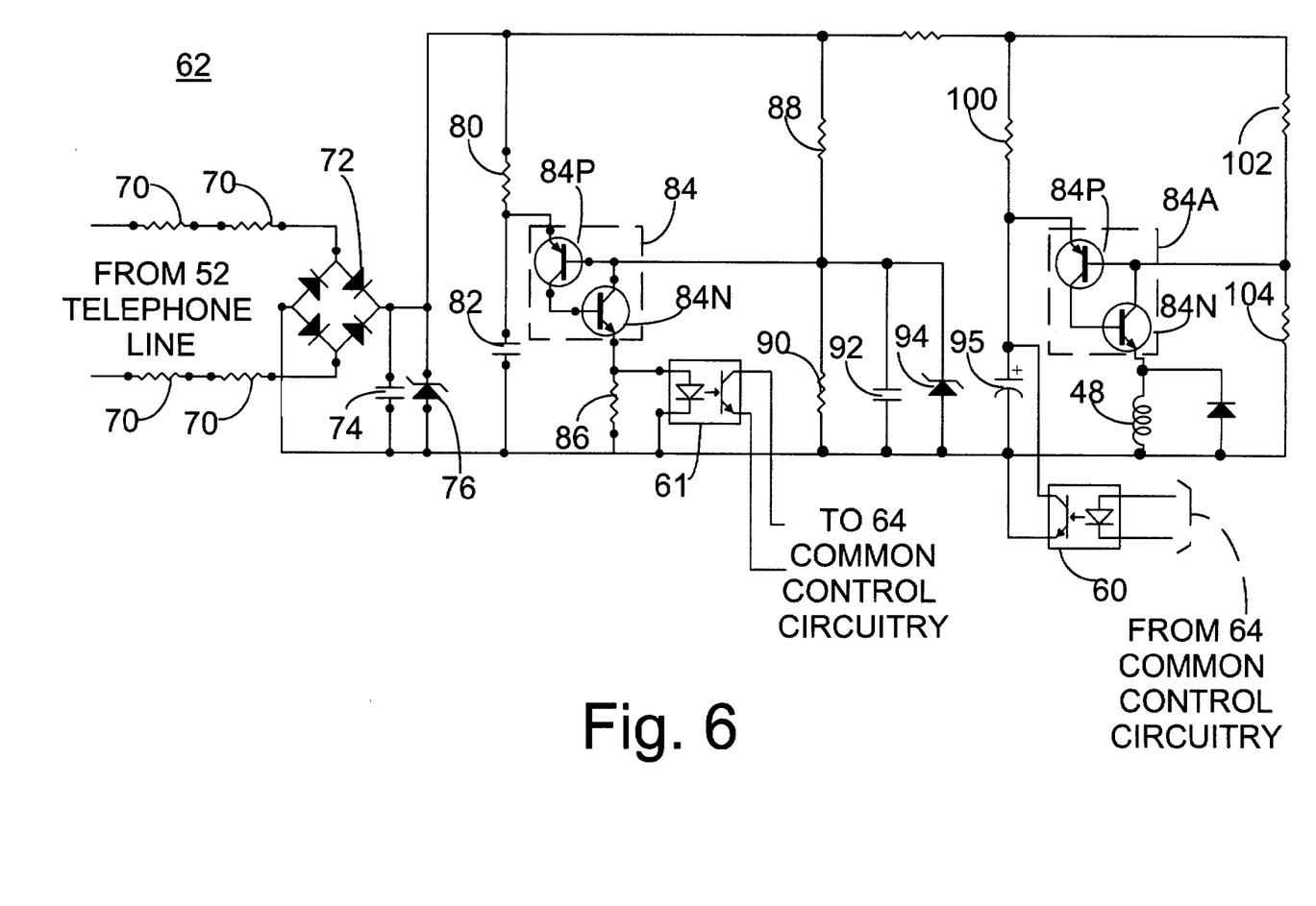
FIG. 6 is a detailed schematic of the Line Interface circuit.

A more detailed block diagram of one embodiment of the ATLS is shown in FIG. 5. The latching relay 58 has two coils 48 and 48A. The side B line interface 62 activated coil 48 to force relay 58 to toggle and establish a connection between connector 42 and 44. Conversely the Side A line interface 62A activated coil 48A to force relay 58 to toggle and establish the connection between connector 44 and 46. Protection 50 is a combination of an over-voltage and current limiting circuit to protect relay 58 from transient that may be present on the telephone line at 42. This protection is designed to pass, without distortion, high frequency data signals. Protection 50 also includes provisions for a distinctive impedance signature to enable telephone line test equipment used by LECs to detect the presence of the ATLS. The side B line interface circuit 62 shown in FIG. 6 is identical to the SideA circuit 62A. A description of the overall strategy of reducing the current consumption of this ATLS is necessary to understand the circuitry. Ninh, page 5 lines 5 to 18 of his patent, describes extracting between 367 and 1,960 milliwatts from the telephone line in the off-hook state. The ATLS uses between 288 and 2208 microwatts. The power requirement of the ATLS are close to 1,000 times less than prior art described in Ninh and require an innovative technology not foreseen by Ninh, Ben-David, US Patent Application 2002/0015489, dated Feb. 7, 2002 or others.

Description of Line Interface 62 of FIG. 6

A high impedance line interface is composed of resistors 70, Diode Bridge 72, capacitor 74 and zener 76. The four identical resistors 70 have total impedance greater than one meghoms. The circuit is protected from high voltage transients without requiring bulky current limiting and voltage clamp devices used in prior art equipment. A high voltage spikes present at 52 will be evenly distributed among the equal value resistors 70 and blocked while dissipating very little energy. This is one of many important benefit of using a very high impedance telephone line interface. In addition, test equipment and Asymmetric Digital Subscriber Line (ADSL) data transmission equipment used by LECs is not adversely affected by the presence of the ATLS.

Complimentary PNP 84P and NPN 84N transistors with good micro-amp current gain are used for unijunction circuits 84 and 84A. This innovative design eliminates the drawbacks of prior art such as Stein, U.S. Pat. No. 3,882, 421, dated May 6, 1975, where conventional unijunction transistors tend to latch up when used in circuits where the gate impedance is greater than one meghom. The gate impedance is the parallel combination of resistors 88 and 90 and of resistors 102 and 104, both are greater than 2 meg-ohms while the charging resistors 80 and 100 are over 20 meg-ohms. The zener diode 94, used in an unconventional way below its minimum reverse current, acts as a variable voltage zener.

A line monitoring circuit detects the line status (on-hook, off-hook, ringing and 60 Hz noise) and communicates this information to the Micro-Controller Unit (MCU) 162 by pulsing it at varying frequencies through isolator 61 to maintain line-to-line isolation. This voltage to frequency circuit is embodied with components 80,82,84,86,88,90,92 and 94. A watchdog circuit discharges capacitor 95 into relay coil 48 and delivers ½ $CV^2$ of energy to switch the latching relay 58 to its side if the common control circuitry 64 does not reset it periodically through isolator 60.

Description of Common Control Circuit 64

Figure 7:
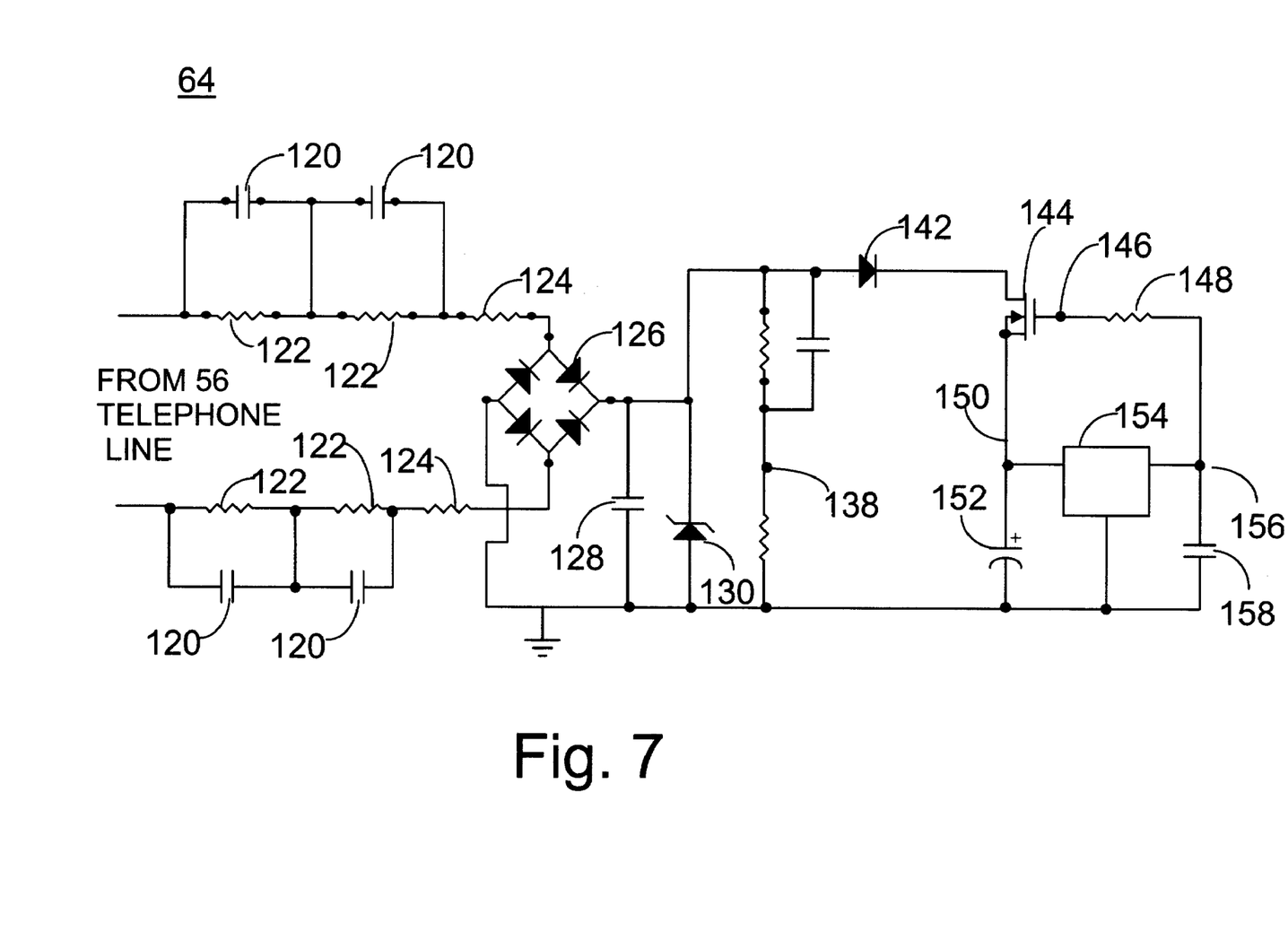
FIG. 7 is a schematic and a block diagram of the Common Control Circuitry.

The common control circuitry 64 is connected to 44 through 56 to draw its power from the network currently connected to the customer-premises telephone line. It includes a line interface and an MCU with peripherals as shown in FIG. 7. The Line interface of FIG. 7 uses a network similar to FIG. 6, embodied by components 122,124,126, 128 and 130. The capacitors 120 are added to provide a path for Alternating Current (AC) signals including but not limited to tones, ringing CallerID and dialtone. A porting of all AC and DC signals present at 56 are extracted at point 138. Diode 142 prevents any DC present on capacitor 152 from feeding back to 138. The low voltage circuitry of the MCU requires a power supply that can provide a constant voltage output 156 while the input 56 varies from less than 3 to more than 100 volts. This is achieved using a high voltage N-channel depletion mode (normally-on) transistor 144 in combination with a low voltage micro-amp quiescent current voltage regulator 154. Gate 146 of transistor 144 is connected to output 156 of regulator 154 with resistor 148 while the source of transistor 144 is connected to the input 150 of regulator 154. The voltage difference between nodes 150 and 146 will rise until the gate-to-source turn-off voltage is reached and transistor 144 turns off. The input to output differential voltage of regulator 154 must be less that the minimum gate-to-source turn-off voltage of transistor 144. Transistor 144 dissipates little energy because of high impedance front-end resistors 122 and 124. Capacitors 152 and 158 are chosen for their low leakage current and provide energy storage to power the MCU circuitry while the telephone line at 42 or 46 is temporarily disconnected because of maintenance activities or power failures. Line interface circuits 62, 62A, and common circuitry 64 were designed not interfere with ADSL transmission or test equipment such as described by Liu. Very eliminating the need for filters often placed in series with telephone equipment that has prior art circuitry not compatible with ADSL technology.

Description of MCU 162 and Associated Circuitry

One embodiment of the MCU 162 and associated circuitry is shown in FIG. 7 (CONTINUED). The signal 138 is feed to amplifier and filter 166 who's output 168 is connected to an analog to digital converter input 169 of MCU 162. Input 168 is the line voltage, dialtone, ringing and other tones input to MCU 162. The CallerID detector is an interface circuit that enables MCU 162 to receive Frequency Shift keying signals used in voiceband data transmissions. It is embodied by feeding signal 138 to bandpass filter 174 who's output 176 is connected to phase-lock-loop input 173 of MCU 162. An output 178 of the MCU 162 provides the means to send tones back to the telephone line through 138. To save power, amplifier 166 is turned on with control signal 164 only when required by MCU 162. MCU output 172 performs the same function for amplifier 174. Regulator output 156 is the source of power for MCU 162. To increase accuracy during measurements of the voltage at point 138, transistor 144 is turn off by output 170F of MCU 162, connected to point 146. Very short pulses from output 170A are used to activate Light Emitting Diode 163 thus conserving energy. Digital inputs and outputs 170B to 170E are connected to isolators 61, 61A, 60 and 60A. The MCU 162 has a low voltage reset circuit 165 to restart the MCU if the line voltage drops two low, a watchdog circuit 167, FLASH memory 179 enabling in circuit programming through connector 66 and internal EEPROM 175 to store system variables. These internal circuits can be embodied in external components.

Description of the Software

Figure 8:
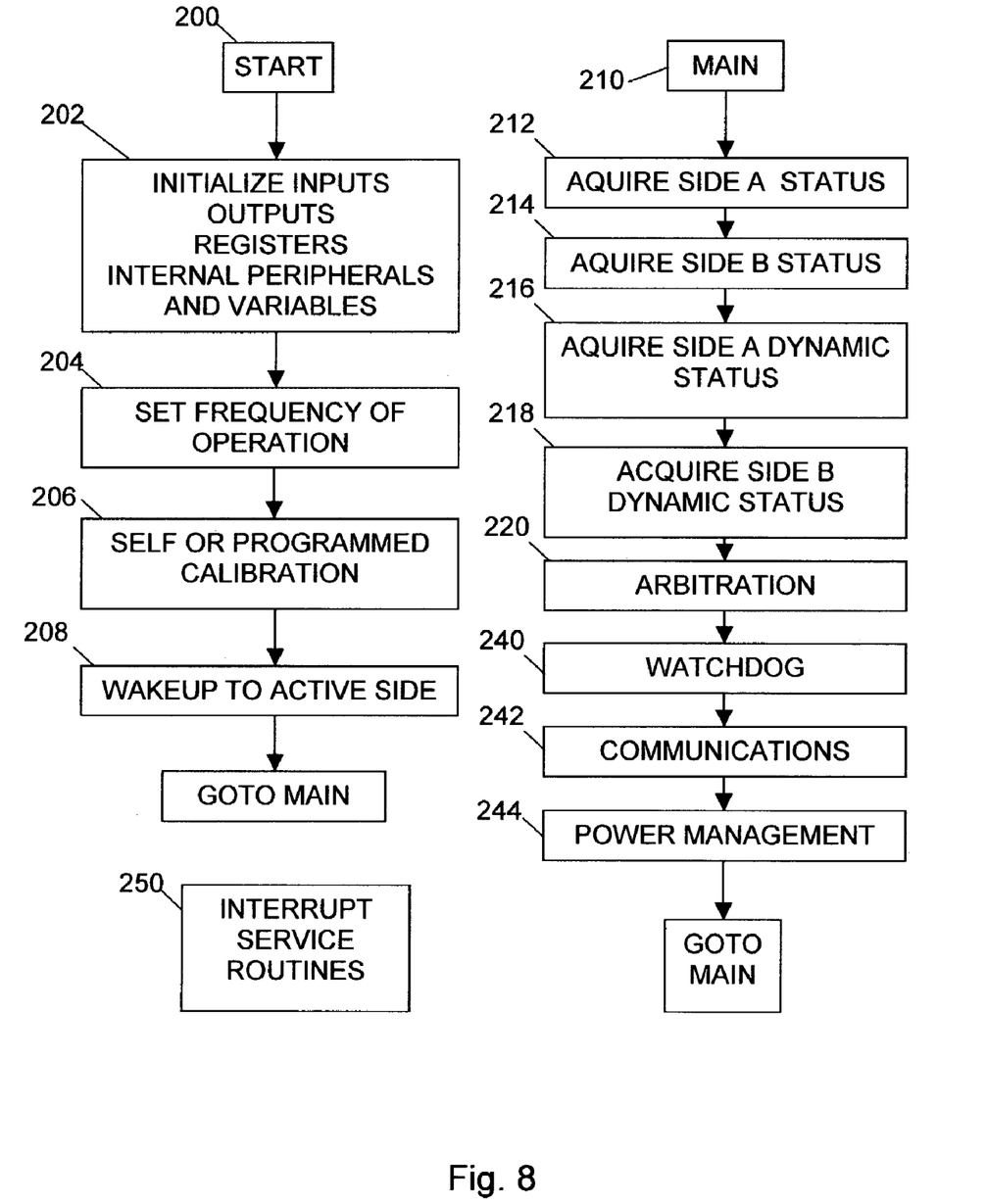
FIG. 8 is a software block diagram.

The software method used by the hardware embodiment to switch the telephone lines is shown in FIG. 8. The software is designed using modular tasks that can be added or deleted to configure the functionality of the ATLS as required. Tasks that are conditional on the side of the switch are suspended when the switch is not on their side. A single bit flag, SideA/SideB, is used to keep track of the switch side.

The MCU starts execution at step 200 when power is applied. In task 202 the MCU initializes all inputs, outputs, registers, internal peripherals and variables. In task 204 the MCU sets its frequency of operation and timer prescalers. In task 206 the MCU reads any calibration data stored in non-volatile memory and performs a self-calibration. At the end of task 206 the MCU enables interrupts. In task 208 the MCU determines if there is battery on one side only to wake up on that side by initializing the variables accordingly. The MCU then jumps to the main program 210.

The main program 210 is similar to a multitasking operating system in which the task priorities and schedules are fixed. It calls the required routines to perform all tasks.

In task 212 ACQUIRE SIDE A STATUS, the MCU reads the I/O flags, variables, analog to digital conversion registers and counters to determine the status of line A. The status includes but is not limited to on-hook, off-hook, ringing, distinctive ringing, no battery, 60 Hz noise, battery voltage and transition flags from one state to the next for each status variables. The 60 Hz noise detection is used to discriminate between valid signals and 60 Hz noise present on the telephone line. Prior art designs such as Ninh use low impedance ring detectors not susceptible to 60 Hz noise. The ATLS uses a very high impedance line interface and ring detector requiring new and innovative ways to overcome its apparent limitations.

In task 214 the status of line B is acquired.

In task 216 the MCU acquires events including but not limited to dialtone detection, stuttering dialtone, hook flash, CallerID messages, DTMF, tones, incoming call detection and outgoing call detection. The CallerID routine reads and decodes the CallerID bits and assembles the messages. These events are time related. For example: the dialtone detection reads the outgoing call flags set by the status task to determine if it is time to look for dialtone. It then detects if dialtone is present for up to four seconds and sets the dialtone-detected flag accordingly.

The acquire side B events 218 performs the same tasks on the side B.

An arbitration task 220 performs an analysis of the signals and activity of each side and determines the desired state of the relay, i.e.: on which side the relay should be. This is done by assigning a weight to each side and toggling a SideA/SideB bit according to the highest weight (max=255 min=0). This method is embodied with the following tasks: task 222 takes into account special conditions requiring a suspension of arbitration. The most important of these special conditions is off-hook. To avoid disconnecting a subscriber while he or she is using the telephone, the arbitration tasks must be suspended until the call is terminated. Another special condition suspends the arbitration temporarily for new installations when both local telephone networks may be active. The arbitration task is also suspended when there is battery only on one local telephone network since it is not required. Arbitration may also be suspended as a result of special conditions that may be implemented to force the switch to one side. Task 224 ensures the weights of both sides are never equal to avoid a lock-up situation. Task 226 then proceed to evaluate the conditions to increment the sideA weight. Off-hook followed by dialtone detection, ringing, distinctive ringing, CallerID, Tones, DTMF digits, hook flashes, battery voltage contribute to increase the weight. The task 226 then proceeds to evaluate conditions that decrease the weight of the sideA. Off-Hook without dialtone, no battery, no activity, tones, specific CallerID messages, specific DTMF signals serve to decrease the weight. Task 228 repeats the incremental and decremental functions for the SideB. A no battery condition is detected and taken into account when updating the weights of each line by decrementing the weight at a slower pace than the ATLS hold-up time. Thus if a power failure caused a loss of battery, the ATLS will hold its switch side as long as possible. Task 230 then compares the two weights and when the weight of one side is higher than the other side, the task updates the SideA/SideB bit. Task 232 can be added to perform specialized switching functions. For example it can switch to SideB only when SideA is idle and there is ringing on SideB. It can then return to SideA after the call is terminated.

The Watchdog task 240 reads the SideA/SideB bit and resets the opposite side watchdog to inhibit it. This ensures the relay is on the correct side. The uninhibited watchdog continuously forces the relay to its side because it is not inhibited. The internal MCU watchdog 167 is periodically reset to ensure proper software execution.

The Communications task 242 communicates status information by pulsing the LED 163 at varying rates. It is also used to output tones to the telephone line.

The Power Management task 244 puts the MCU in sleep mode when required. Some power management functions are implemented in other tasks. The dial tone task powers the dial tone detection circuit and comparators only when required. The MCU then cycles back to the start of MAIN.

The Interrupts task 250 is activated by interrupts. It determines the source of the interrupts and executes the corresponding routines. One routine respond to pulsing of the MCU inputs 170C, 170E by updating counters to determine the relative period between pulses. This information is made available to other tasks. The internal timer interrupt routine maintains a time reference used to time functions and events. It also updated several count down timers used by other tasks.

OTHER EMBODIMENTS

Figure 9:
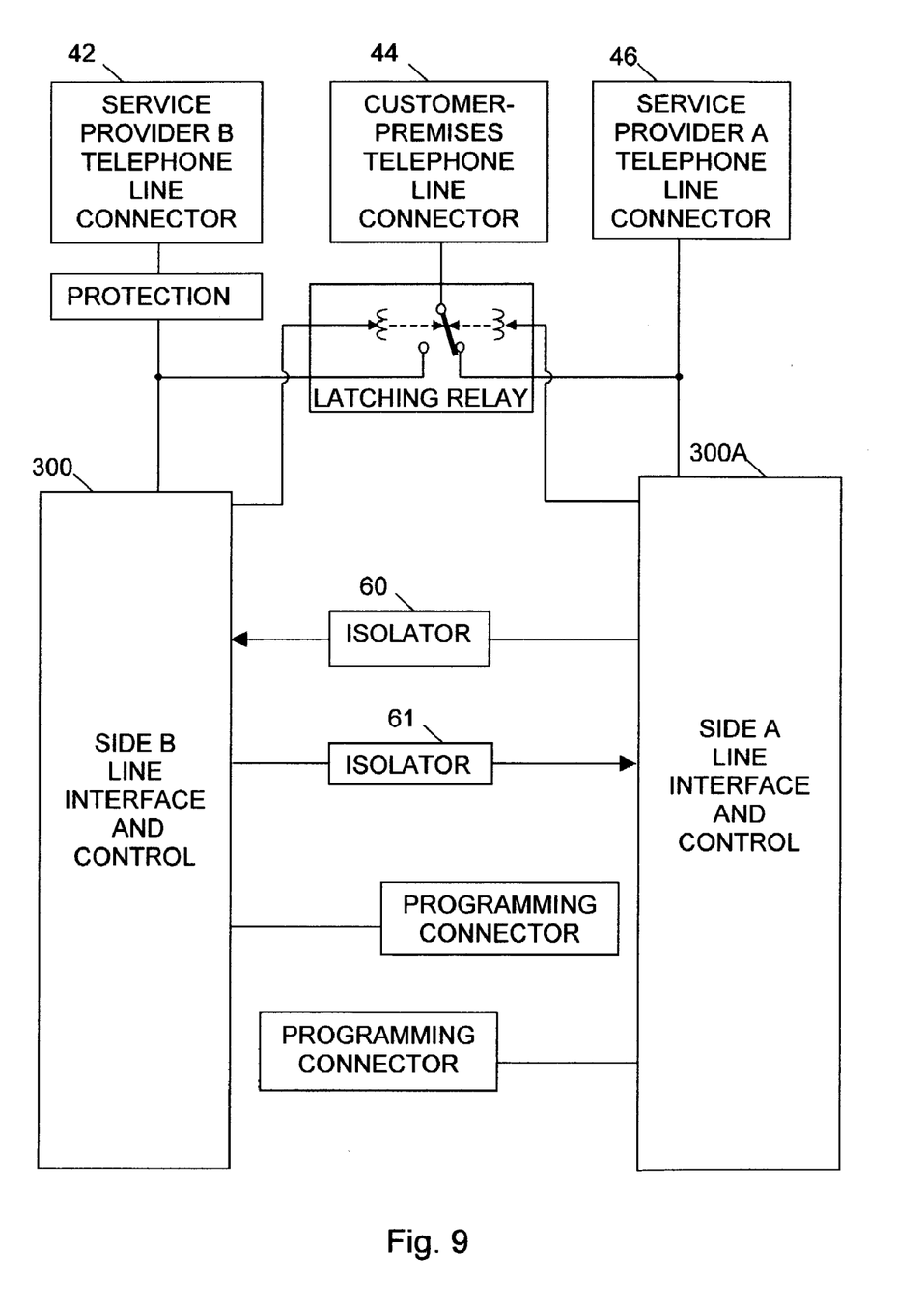
FIG. 9 is an alternate embodiment of the ATLS with dual MCUs.
Figure 10:
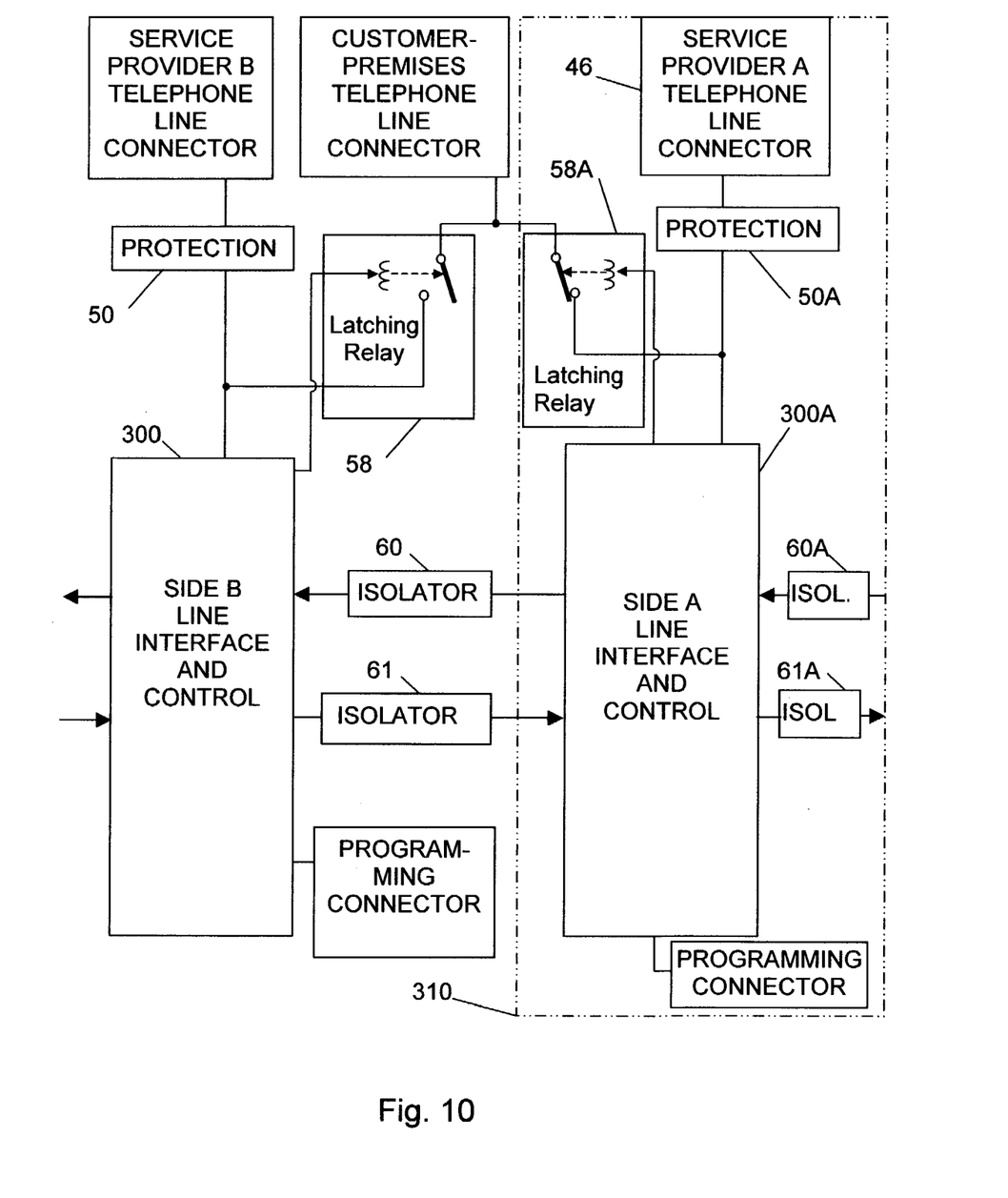
FIG. 10 is an alternate embodiment of the ATLS with connections to a plurality of networks.

FIG. 9 is an alternate embodiment of the telephone line switch. The common circuitry is placed on each side and is called Line Interface and Control 300 and 300A. Only two isolators 60 and 61A are required to exchange information between the two MCUs. The communication task is modified in this embodiment to perform an information exchange between the two MCUs. The acquire-status and acquire-event tasks of opposite sides use the communication task instead of the directly connected hardware discussed earlier. The modular design of the software discussed above enables suspension of the arbitration task on the MCU that is not connected to the telephone line based on the SideA/SideB flag. Still another embodiment expands the number of telephone lines. FIG. 10 shows how this can be accomplished by replacing relay 58 with single pole relays 58A and 58B and cascading the circuits enclosed in dotted line 310. A communication path between all interface and control circuit is required for this embodiment. This can be implemented with opto-isolators 60, 60A, 61 and 61A between each circuit or by using a bus type communication structure where the isolators are transformers or capacitors. Protection circuit 50A is added if it is anticipated the additional network connections will have a very long local telephone line. Since the ATLS is capable of many measurements and can communicate through the telephone line, another embodiment adds line testing and reporting functionality. The present embodiment of the ATLS, designed to operate at the customer-premises end of the local telephone network, does not preclude placing it at the originating end of the local telephone network. The MCU internal circuits can be embodied in external components.

What is claimed:

1. A telephone line switch comprising:
   a first pair of terminals for connection to a customer-premises telephone line;
   a second pair of terminals for connection to a first telephone network through a first line interface;
   a third pair of terminals for connection to a second telephone network through a second line interface;
   a switching apparatus for automatically connecting said first pair of terminals to said second pair of terminals or to said third pair of terminals, said apparatus comprising
   means for operating said switching apparatus including signal monitoring electronic circuitry coupled to said first telephone network, signal monitoring electronic circuitry coupled to said second pair of terminals, electronic control circuitry, processing means and software means for causing said switching apparatus to automatically selectively connect said first pair of terminals to said second pair of terminals or to said third pair of terminals based on a weight determined by each of said signal monitoring electronic circuitry, wherein each of said second and third pair of terminals are further provided with a line interface having an impedance greater than 1MΩ, said line interface being located between a respective one of said first and second telephone networks and said switching apparatus.

2. The telephone line switch of claim 1 wherein said processing means and said software means comprising:
   a method for determining the desired state of said switching apparatus from an analysis of the output of said signal monitoring electronic circuitry; and
   a method for causing said switching apparatus to selectively connect said first pair of terminals to said second pair of terminals or to said third pair of terminals based on said desired state.

3. The telephone line switch of claim 1 wherein said switching apparatus and said means for operating said switching apparatus have no connection to an external power source.

4. The telephone line switch of claim 1 wherein said first and second local telephone networks have different electrical and operational characteristics.

5. The telephone line switch of claim 1 wherein said switching apparatus is adapted to less than 100 microamperes of current supplied by said telephone networks.

6. A method for selectively connecting a customer-premises local telephone line to one of a plurality of local telephone networks with a telephone line switch comprising:
- a first pair of terminals for connection to a customer-premises telephone line;
- a second pair of terminals for connection to a first telephone network through a first line interface;
- a third pair of terminals for connection to a second telephone network through a second line interface;
- a switching apparatus for automatically connecting said first pair of terminals to said second pair of terminals or to said third pair of terminals, said apparatus comprising means for operating said switching apparatus including signal monitoring electronic circuitry coupled to said first telephone network, signal monitoring electronic circuitry coupled to said second pair of terminals, electronic control circuitry, processing means and software means for causing said switching apparatus to automatically selectively connect said first pair of terminals to said second pair of terminals or to said third pair of terminals based on a weight determined by each of said signal monitoring electronic circuitry, wherein each of said second and third pair of terminals are further provided with a line interface having an impedance greater than 1MΩ, said line interface being located between a respective one of said first and second telephone network and said switching apparatus, determining the states of each local telephone network;

determining the events on each local telephone network;

calculating a weight respectively for each telephone network said weights based upon said respective states and said respective events;

determining the local telephone network with the highest weight; and automatically connecting said customer-premises local telephone line to said local telephone network with the highest weight.

7. The method for selectively connecting a customer-premises local telephone line of claim 6 wherein at least two of said plurality of local telephone network have different electrical and operational characteristics.

* * * * *